United States Patent [19]
Guerci et al.

[11] 3,846,680
[45] Nov. 5, 1974

[54] AUTOMATIC-CONTROL ELECTRONIC APPARATUS FOR MACHINE TOOLS INCLUDING PROVISION FOR ZERO OFFSET

[75] Inventors: Carlo Guerci, Ivrea; Amerigo Vigiliermo, Baio Dora, both of Italy

[73] Assignee: Ing. C. Olivetti & C., S.p.A., Ivrea, Italy

[22] Filed: Nov. 5, 1971

[21] Appl. No.: 195,912

[30] Foreign Application Priority Data
Nov. 7, 1970 Italy .............................. 70707/70

[52] U.S. Cl. .................. 318/685, 318/572, 318/603, 318/601
[51] Int. Cl. .......................................... G05b 19/36
[58] Field of Search .......... 318/576, 696, 685, 439, 318/138, 254, 600, 601, 603, 594, 597; 90/13 C

[56] References Cited
UNITED STATES PATENTS

| | | | |
|---|---|---|---|
| 3,218,532 | 11/1965 | Toscano | 318/603 |
| 3,292,168 | 12/1966 | Gray | 318/576 X |
| 3,297,929 | 1/1967 | Gardiner et al. | 318/696 X |
| 3,414,786 | 12/1968 | Kasmer et al. | 318/685 |
| 3,416,056 | 12/1968 | Motooka et al. | 318/685 X |
| 3,453,549 | 7/1969 | Payne et al. | 318/572 |
| 3,548,281 | 12/1970 | Anis | 318/685 |
| 3,573,586 | 4/1971 | Littmium | 318/579 |
| 3,626,266 | 12/1971 | Sindelar | 318/572 |

*Primary Examiner*—G. R. Simmons
*Attorney, Agent, or Firm*—Schuyler, Birch, Swindler, McKie & Beckett

[57] ABSTRACT

An electronically operated automatic control for machine tools is described wherein the tool or movable member is transversely movable toward and away from a stationary member, which might be a workpiece or tool holder. The movable member is driven by a stepping motor. Pulses are supplied to the motor for powering same. A pulse counter is provided so that the amount of movement of the motor is controlled by the counter. The counter can be set to zero for any position of the moveable member, so that all displacements of the movable member are measured by the counter beginning at the latter position, where the counter was set to zero.

11 Claims, 6 Drawing Figures

AUTOMATIC-CONTROL ELECTRONIC APPARATUS FOR MACHINE TOOLS INCLUDING PROVISION FOR ZERO OFFSET

BACKGROUND OF THE INVENTION

This invention relates to an electronic control apparatus which enables machine tools to accomplish, in an automatic manner, a predetermined processing cycle chosen from a plurality of cycles. The cycles can be manually set, together with the processing dimensions, on a panel of the machine.

The apparatus of the invention is intended for control of a machine tool wherein the member which carries the tool (normally and axially displaceable head), or the workhead, can be displaced with a rapid stroke in order to approach the workpiece (or the tool) and with a slow working stroke during which the tool removes material from the workpiece. The apparatus in accordance with the invention can be utilized in any machine of the kind described above, such as for instance milling machines, lathes, grinders and the like.

Machine tools are already known wherein the cutterhead can move with a rapid stroke to approach the workpiece, under the control of a hydraulic cylinder, and with a slow working stroke (micrometric feed) under the control of a lead screw and nut assembly actuated by an electric motor. A suitable device controls the micrometric feed and is provided with suitable graduated indicators on which the working strokes of the head can be set, corresponding to the thickness of material to be removed from the workpiece during processing.

The processing of a workpiece effected with a machine of the above kind often requires several manual setting operations as well as careful controls on the workpiece and the machine, which render said processing long and expensive and need especially trained operators.

In fact, at the start of each working cycle is it necessary to manually set in an approximate manner on the aforementioned device, which controls the micrometric working feed of the cutterhead, the value of the thickness of material to be removed during processing. This setting operation, accomplished by first selecting the zero position on suitable indicators of the aforementioned device (position corresponding to the position of contact of the tool with the workpiece) and subsequently, adjusting the position of suitable stops of said device, requires great care and considerable time.

Moreover, since this device, on account of its low accuracy, is not able to exactly control the displacements of the cutterhead, in order to process a workpiece with a predetermined dimension it is necessary to normally effect, first, a measurement (for instance, with a micrometer) of the diameter of the workpiece and then to effect a further processing of the workpiece on the basis of the indication obtained.

Further, to accomplish again the same or another working cycle, it is necessary to repeat the setup operation described above (determination of the position of the zero on the indicators), since the zero position established for a given diameter cannot be used for other diameters.

Machine tools are also known, which are provided with a drive unit with numerical control and with which it is possible to automatically accomplish predetermined working cycles. Said drive unit is supplied with all information, normally recorded on a punched tape, required to control the various components of the machine. Such drive units are considerably complex, expensive and delicate. In order to operate numerically controlled machines the services of a skilled programmer are needed, and this can be quite uneconomical in processing medium or small jobs.

Other machine tools are known, wherein the displacement of the cutterhead is actuated by a step by step electric motor controlled by an electronic apparatus on which it is possible to directly set the displacements to be accomplished by said head during a predetermined working cycle. These apparatus, however, require the use of a measuring device adapted to supply the apparatus, in a continuous manner, indications of the dimensions of the workpiece. With such machines, it is possible to accomplish, in an automatic manner, a limited number of working cycles on a single diameter. The apparatus in this case proves to be rather complex and its operation is difficult.

It is, therefore, an object of this invention to provide an automatic control apparatus which can be directly applied to machine tools in order to avoid the deficiencies and disadvantages pointed out hereinabove.

SUMMARY OF THE INVENTION

To obtain the aforementioned and other objects the invention described herein comprises a cutterhead or a workhead transversely movable towards and away from a workpiece or from a tool holder and driven by a stepping electric motor. The motor is controlled by a pulse sent to said motor, is characterized in that said counter can be reset in any predetermined position of the head, all the displacements of said head during a cycle whatever of the machine being solely measured by means of the pulses counted by said counter starting from the aforementioned resetting position.

BRIEF DESCRIPTION OF THE DRAWINGS

In order to permit an understanding of the principles of the invention, an exemplary embodiment constructed according to these principles is described hereinbelow in conjunction with the following drawings wherein.

DETAILED DESCRIPTION OF THE DRAWINGS

Figure 1:
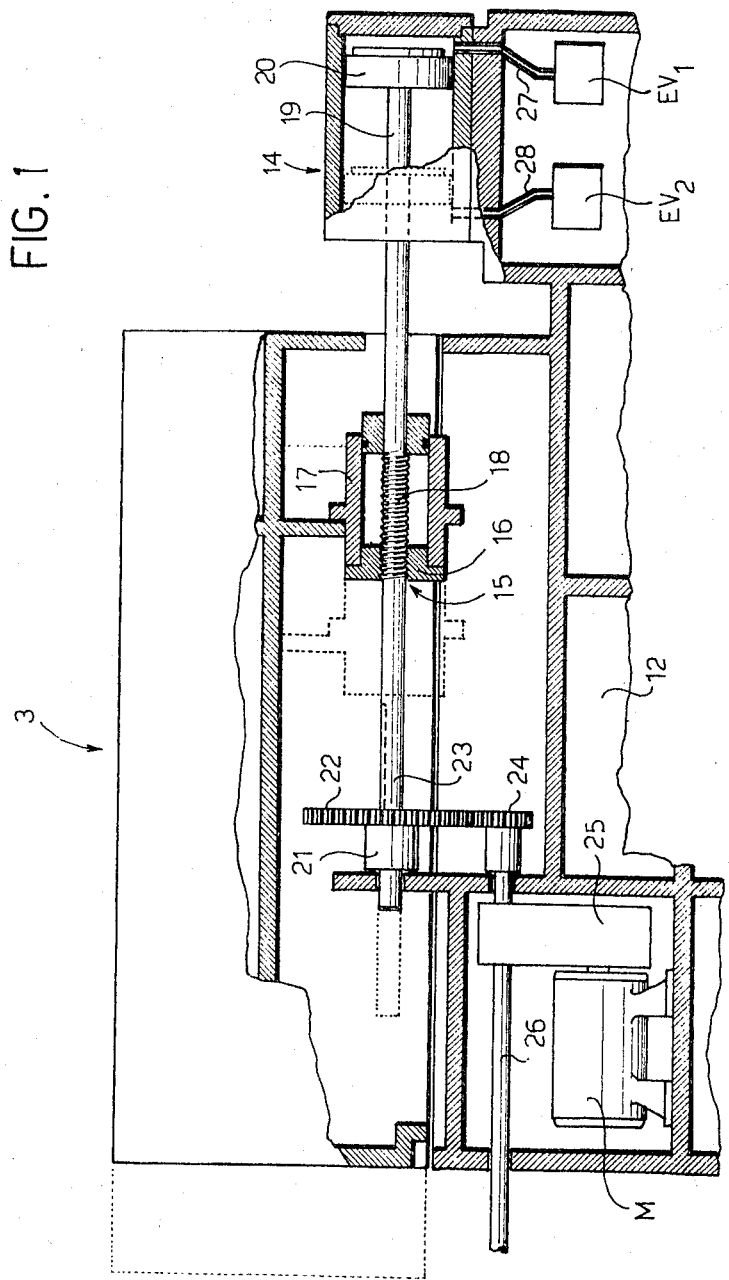
FIG. 1 is a diagrammatic side view, partially in section, of the actuating means of a cutterhead driven by the apparatus constructed in accordance with the invention.

The preferred embodiment of the apparatus constructed in accordance with the invention described and illustrated herein is intended for the automatic control of a machine tool comprising a cutterhead 3 (FIG. 1) transversely movable relative to a bed (not shown) which carries a table on which the workpiece is mounted between a workhead and a tailstock or center in a known manner.

On the front part of the head 3 a tool is mounted (not shown), which is driven by suitable known means. The head 3 is normally slidable on a platform 12 of said bed. To the platform 12 there is fastened a double-acting hydraulic cylinder 14 which displaces the head 3 with a rapid stroke, while the micrometric working displacement of the head is brought about by a lead screw and nut assembly 15 disposed inside the head. The nut screw 16 of said assembly is made integral with the head 3 by means of a bushing 17, while the screw 18 coupled to said nut is rotatable and is integral with the rod 19 of the piston 20 of the cylinder 14. The screw 18 is torsionally integral with a sleeve 21 provided with a gear 22 inside which the end portion 23 of said screw is slidable. The connection between the portion 23 and the sleeve (not shown) can be attained in any suitable manner, for instance, by means of a splined coupling or with tabs or the like. The motion is transmitted to the gear 22, through another gear 24, from a reduction unit 25 actuated by a step motor M. The rotation of the gear 24 and, therefore, of the screw 18, can be also obtained by causing to rotate manually, for instance, by means of a handwheel, a shaft 26 connected with said gear.

The cylinder 14 is connected with a source of pressure fluid through ducts 27 and 28 adapted to feed the fluid to said cylinder so as to actuate the rapid stroke, forward and backward respectively, of the head 3 and controlled by electric control valves shown at $EV_1$ and $EV_2$, respectively.

Figure 2:
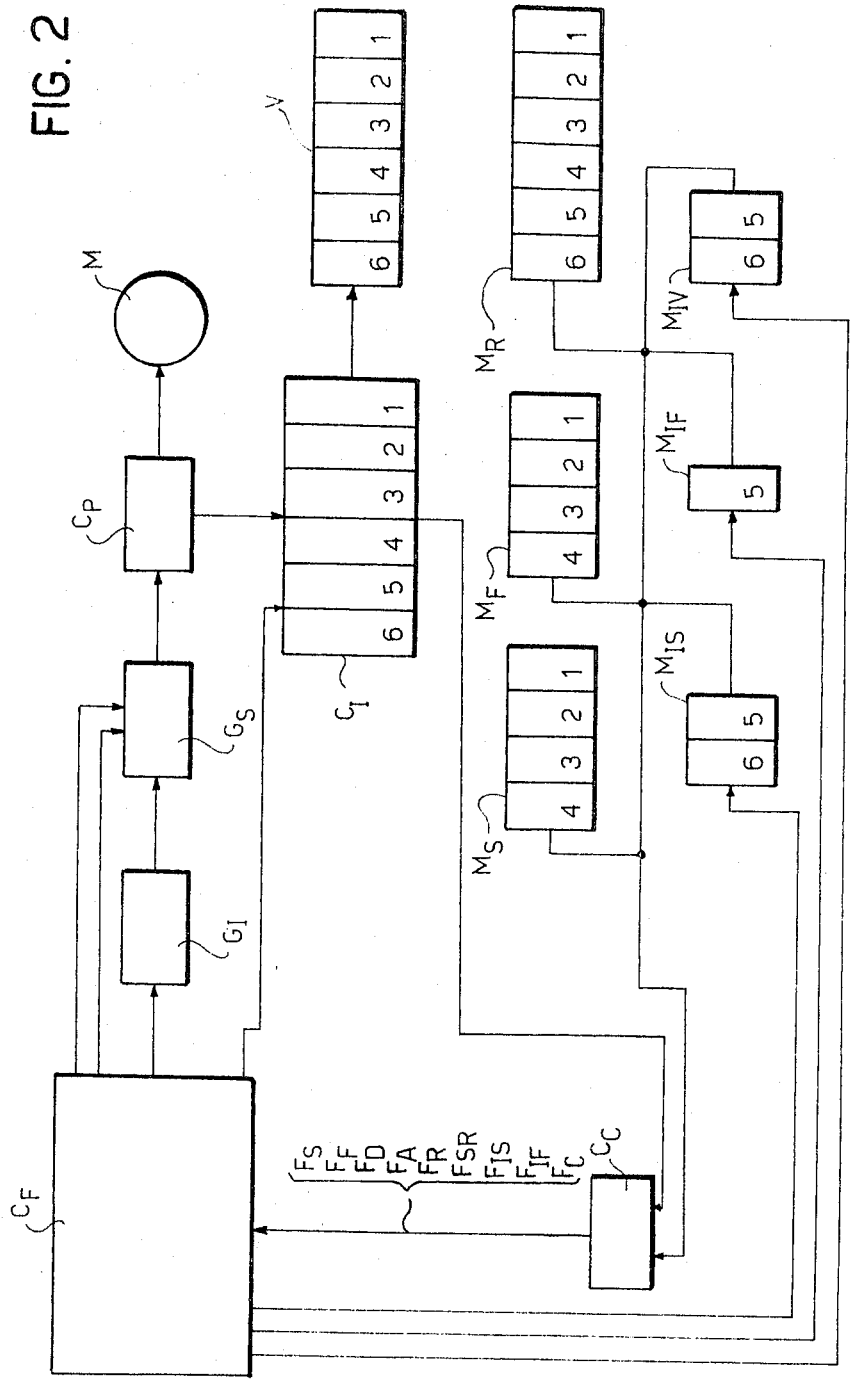
FIG. 2 is a block diagram of a control apparatus constructed according to the principles of the invention.
Figure 5:
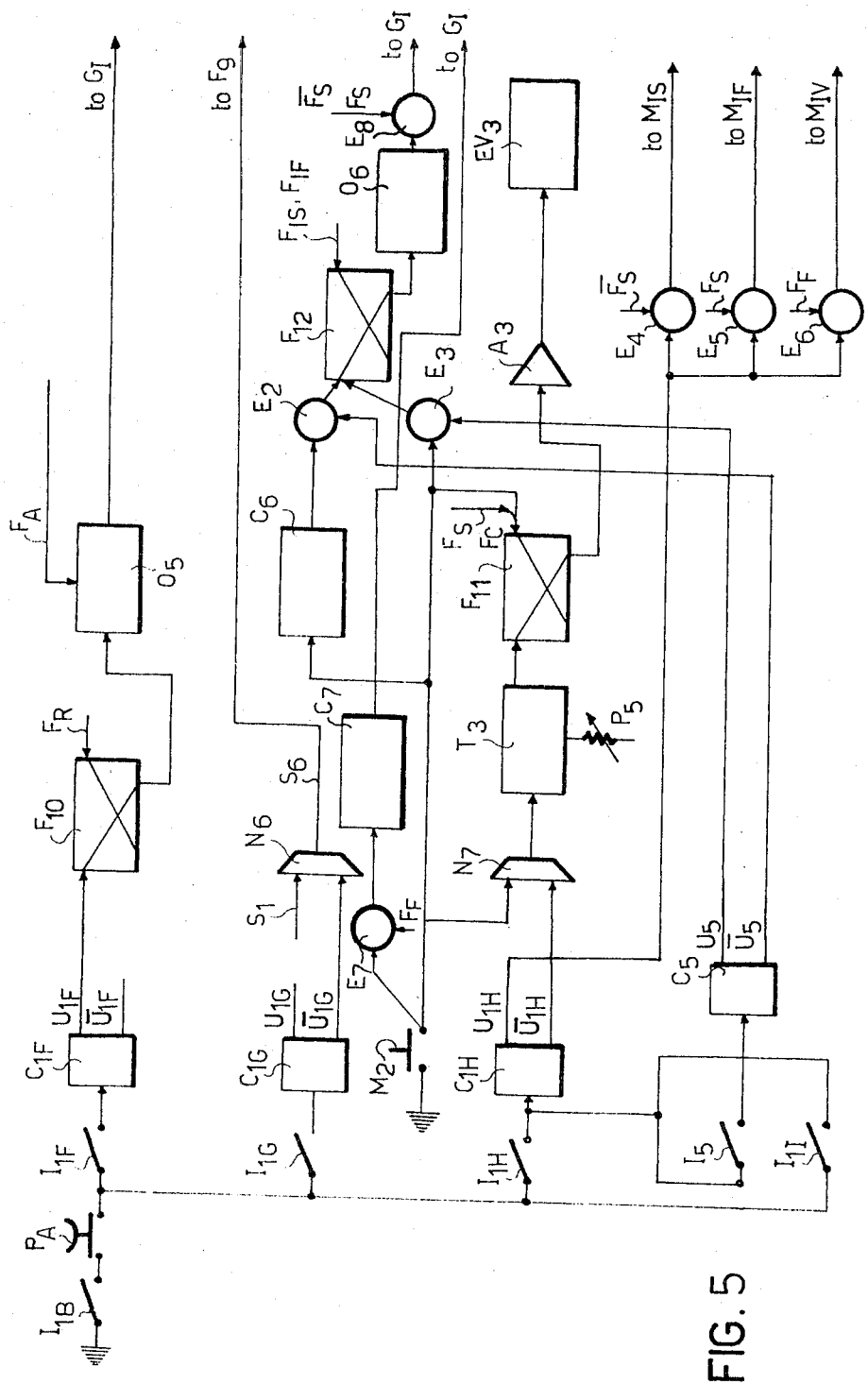
FIG. 5 is a schematic diagram of a third part of the electronic circuit controlling the functions of said machine and which forms part of the apparatus of FIG. 2.

The electronic apparatus in accordance with the invention is illustrated in FIGS. 2 and 5 and is connected, by means of appropriate electric connections, with some electric components incorporated in the machine tool, such as the motor M (FIG. 1), the electric control valves $EV_1$ and $EV_2$ and other components which will be discussed below.

With reference to FIG. 2, the step motor M receives pulses from a pulse generator $G_1$ controlled by a control circuit of the functions of the machine, shown generally at $C_F$. Between the pulse generator $G_I$ and the motor M there are connected a sequence generator $G_S$ and a power circuit $C_P$. The generator $G_S$ is connected with the circuit $C_F$ and is adapted to modify the pulses coming from the generator $G_I$, so that the rotation of the motor M will take place in a predetermined direction. The circuit $C_P$ is an amplifier for amplifying the energy of said pulses in order to feed the motor M.

A pulse counter $C_I$, provided with six counting decades and operating in a binary code, is connected directly with the circuit $C_P$, with the circuit $C_F$ and with an appropriate visualizer V which gives a visual numerical indication or display of the pulses counted by said counter. Three manual dimension setting devices or manipulators $M_S$ $M_F$ and $M_R$ as well as the pulse counter $C_I$ are connected with a coincidence circuit $C_C$, in such a manner that the latter will be able to generate a signal when the number of pulses counted by the counter $C_I$ is equal to the number of pulses set on anyone of said setting devices $M_S$, $M_F$ or $M_R$. Other manual dimension setting devices $M_{IS}$, $M_{IF}$ and $M_{IV}$, the first and the last of which are provided with two decades while the third is provided with one decade only, are connected with either the function control circuit $C_F$, and with the setting devices $M_S$, $M_F$ and $M_R$. The connection of the setting devices $M_{IS}$, $M_{IF}$ and $M_{IV}$ with the counter $C_I$ is established in such a manner that, when one of them is energized in the manner to be described below, the pulses counted by said counter will be counted, respectively, in the last decades to the left (setting devices $M_{IS}$ or $M_{IV}$ energized) or in the last but one decade to the left (setting device $M_{IF}$ energized). Further, in the case of the latter setting devices also, when the coincidence between the number of pulses counted by the counter $C_I$ and the number set on the one of them which is energized is reached, the coincidence circuit $C_C$ will be able to emit a signal.

The control circuit of the functions of the machine, $C_F$, associated with the component just described and illustrated in FIG. 2, is adapted to control the main functions of the machine, in order that the same may automatically accomplish a predetermined working cycle.

Before describing the structure of the circuit $C_F$, it will be suitable to briefly examine the stages constituting the main working circuits controlled by said circuit and which can be automatically accomplished by the machine upon setting of some data relating to the cycle to be carried out, effected on a panel 30 (FIG. 6) of the apparatus.

The setup cycle has substantially the purpose of permitting the setting the starting or zero position, or the resetting position, from which the measurement of the displacements of the cutterhead 3 (FIG. 1), relative to the workpiece, begins in a subsequent working cycle. This is attained by bringing, for instance, the tool into contact with the workpiece and resetting in this position the device which controls the displacement of the head 3.

During this cycle, the head 3 can be displaced towards the workpiece in three different manners; namely, with a rapid stroke of the head 3 relative to the platform 12 actuated by the hydraulic cylinder 14, with a slow and continuous progress of the head 3 relative to the platform, actuated by the lead screw and nut assembly 15 and obtained by sending a sequence of pulses to the motor M, or with subsequent micrometric displacements, each of which is actuated by a single pulse applied to said motor.

The "working" cycle substantially has the purpose of processing a cylindrical portion of a workpiece, normally with said workpiece in rotation, while the cutterhead 3 (FIG. 1) advances radially towards the workpiece. During machining of the workpiece, the feed movement of said cutterhead 3 normally takes place with two different speeds, i.e., a higher roughing-out speed and a finishing, lower speed. Upon completion of machining proper, the workpiece is held in contact with the revolving tool, without transversely displacing the cutterhead 3 relative to the workpiece.

The "cutting in air" cycle is normally accomplished when a series of pieces have to be machined, whose diameters are not rigorously equal but, on account of the working tolerances of the operation preceding the one to be carried out on the machine, said pieces have diameters within a certain range. In this instance, the resetting position of the tool, which has been chosen in the preceding setup cycle, is such that the active surface of said tool will be at a distance, from the axis of the workpiece, which is equal to or greater than the maximum radius that said workpiece can have. The stroke of the tool, starting from said resetting position to come into contact with the workpiece and to start the machining operation, is effected with a speed greater than the maximum working velocity of the machine. As soon as the tool has come into contact with the workpiece, a succession of stages is started which is quite identical to the working cycle described previously.

The cycle with arrest during the return stroke, which is similar to the working cycle, comprises a further processing stage that follows the stages constituting the aforementioned cycle and during which a shoulder is normally machined between two cylindrical portions of the workpiece.

The machining operation of said shoulder is carried out after the active surface of the tool has been removed from the surface of the workpiece by a small distance with is equal, for instance, to the thickness of material removed from said workpiece during the finishing operation. Upon completion of said removal stroke of the tool, the workpiece is displaced axially relative to said tool, in order to bring, first, the surface of the shoulder to be machined in contact with the side surface of the tool and to remove, subsequently, other material from said shoulder.

The cycle for machining a series of cylindrical portions of different diameter is accomplished when the workpiece has a series of cylindrical portions of different diameter. Each cylindrical portion is machined with a sequence of stages or steps quite identical to that of the working cycle; to pass from one portion to the subsequent one, the workpiece is displaced longitudinally relative to the tool and then the latter is displaced radially relative to the workpiece, so as to bring the active surface of said tool in contact with that of each subsequent portion of be machined.

The "semirapid" cycle is accomplished when a great amount of material has to be removed from the workpiece by means of a long feed movement of the tool, in radial direction, relative to said piece, for instance, when an annular groove has to be machined on a cylindrical piece. In this instance, the first part of the machining operation is effected by displacing the tool towards the workpiece with a speed higher than that with which said tool is displaced during the subsequent roughing-out and finishing operations which start at the end of said first part of the machining operation.

The cycle with displacement of the worktable is accomplished when cylindrical surfaces whose length is greater than the width of the active surface of the tool must be machined. In this instance, during machining, the workpiece is caused to rotate and simultaneously traversed axially relative to the tool, so as to bring into contact with the active surface of the latter each point of the surface to be machined. The aforementioned traverse movement is imparted to the workpiece by the worktable of the machine; at the end of each stroke (or of two strokes) of said table, when one end of the workpiece is in correspondence with the tool, said end is fed forward towards the workpiece with a predetermined increment.

This cycle comprises one or more roughing-out cuts, one or more finishing cuts and one or more idle cuts, the increments of the roughing-out cuts being greater than those of the finishing cuts and no increment being given during the idle cuts.

When the tool can be sharpened on the machine of when the latter is provided with a tool which must be diamonded, such as for instance a grinding wheel, provision can be also made of sharpening of diamonding cycles.

One first sharpening cycle, with a sharpening device carried by the cutterhead 3 (FIG. 1), is carried out by axially displacing said device in radial direction relative to the tool. This operation can be accomplished when the head 3 is in the position of the end of its backward stroke (i.e., the position of said head in FIG. 1) or in the position of the end of its forward stroke (shown in broken lines in the same figure). In order to bring the active surface of the tool back to the same position relative to the workpiece where it was before the sharpening operation, it is necessary — after said operation — to impart to the tool a displacement towards the workpiece which is equal to the thickness of material removed during said operation.

A second sharpening cycle, with a sharpening device fastened to the worktable of the machine, is carried out by displacing the tool radially and axially relative to the device which is secured to an appropriate fixture carried by the table of the machine.

During this cycle, the relative movement of the tool with respect to the sharpening device is quite identical to that of a workpiece relative to the tool during a cycle with displacement of the table as described above.

Figure 3:
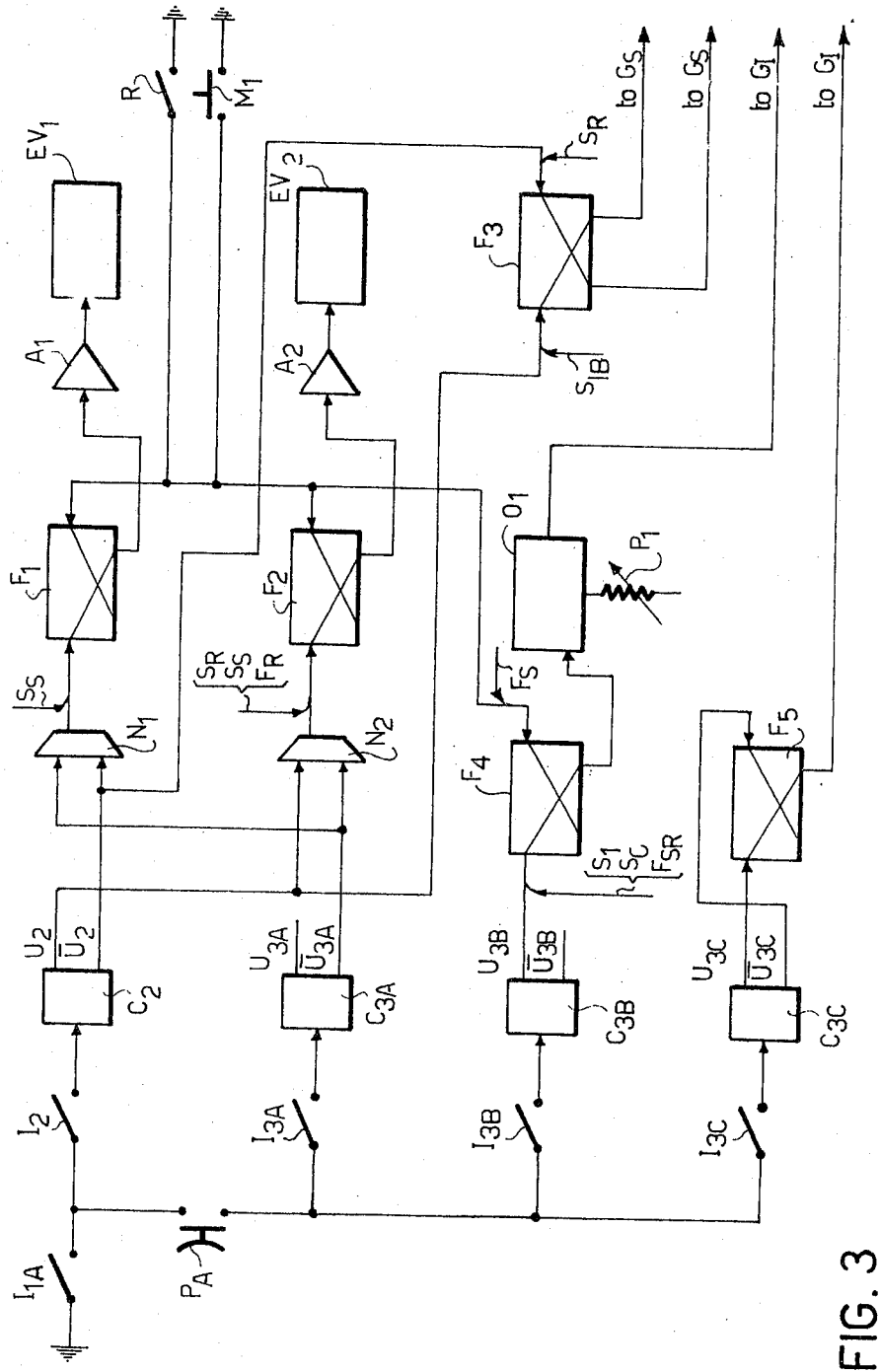
FIG. 3 is a schematic diagram of a first portion of the electronic circuit controlling the function of the machine and which forms part of the apparatus illustrated in FIG. 2.

In order to clarify the description thereof, the circuit for control of the functions of the machine $C_F$ (FIG. 2) has been subdivided into three parts (FIGS. 3, 4 and 5), each of which controls one or more of the cycles described above. The part of the circuit $C_F$ which controls the setup cycle is shown in FIG. 3.

A switch $I_{1A}$, forming part of a selector $I_1$ (FIG. 6) mounted on a panel 30 of the machine, connects the ground with a terminal of four switches $I_2$, $I_{3A}$, $I_{3B}$ and $I_{3C}$, whose other terminals are connected with corresponding logic circuits $C_2$, $C_{3A}$, $C_{3B}$ and $C_{3C}$. The closure of the switch $I_{1A}$ (setting of the selector $I_1$ in the position $I_{1A}$ of FIG. 6) corresponds to the setting of the setup cycle. The three switches $I_{3A}$, $I_{3B}$ and $I_{3C}$ form part of a selector $I_3$, also disposed on the panel 30 (FIG. 6) together with the selector $I_1$; the closed and open positions of the switch $I_2$ correspond, respectively, to the indications AV (FORWARD) and AV (FORWARD) and IN (BACKWARD) on said panel.

Figure 6:
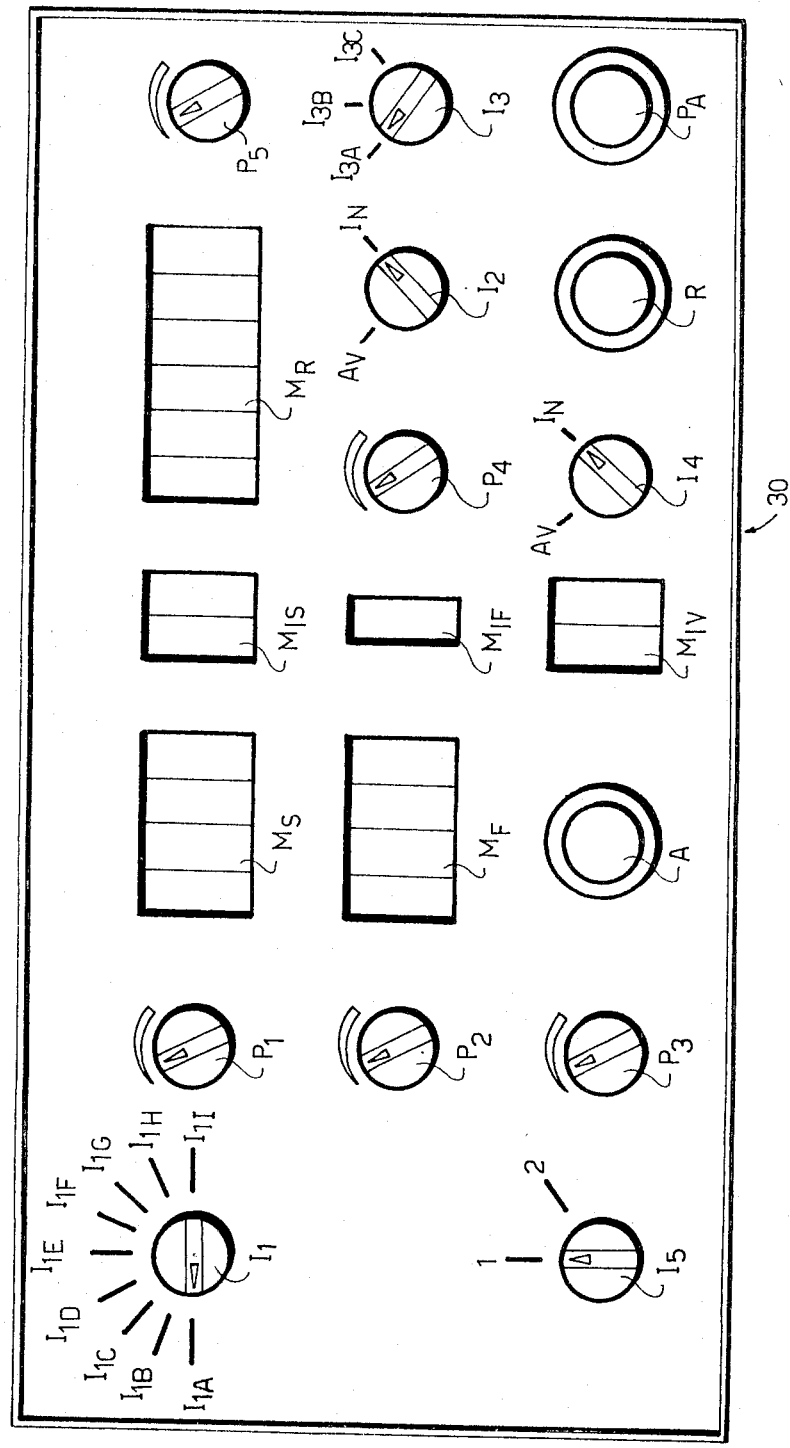
FIG. 6 is a plan view of a control panel of the electronic apparatus of the invention.

Between the switch $I_{1A}$ (FIG. 3) and the switches $I_{3A}$, $I_{3A}$, $I_{3B}$ and $I_{3C}$ a starting pushbutton $P_A$ is disposed, also on the panel 30 (FIG. 6).

Each of the aforementioned logic circuits $C_2$, $C_{3A}$, $C_{3B}$ and $C_{3C}$ is adapted to generate, as a function of an input signal, on the two output terminals thereof (indicated with the same reference as the circuits) two signals which will take solely two states or logical values different from one another, i.e., 0 and 1. Each circuit substantially comprises a pair of logic circuits NOR arranged in such a way that, in the closing position of the switch upstream of said circuit, the logical value of the signal appearing at the output countersigned with an overlining is equal to 0, whilst the logical value appearing at the other output is equal to 1; in the condition corresponding to the opening position of the aforementioned switches, the logical value of each of the signals appearing at the outputs of said logic circuits is reversed.

A pair of logic circuits NOR, $N_1$ and $N_2$, is connected with the circuits $C_2$, $C_{3A}$ respectively; the first of these with the outputs $\overline{U}_2$ of $C_2$ and $U_{3A}$ of $C_{3A}$ and the second with the outputs $U_2$ of $C_2$ and $\overline{U}_{3A}$ of $C_{3A}$.

The output of each of the circuits $N_1$, $N_2$ is connected with the setting input of a corresponding flip-flop $F_1$, $F_2$, while the output of each of said flip-flops is connected, in turn, with a corresponding amplifier $A_1$, $A_2$ disposed upstream of the electric control valves $EV_1$ and $EV_2$ (FIGS. 3 and 1), respectively. As stated above, the electric valve $EV_1$ controls the feeding of pressure fluid to the duct 27 (FIG. 1) of the cylinder 14 of the machine and, therefore, the feed movement of the head 3, while the electric valve $EV_2$ controls the feeding of pressure fluid to the duct 28 of the same cylinder and, therefore, the return movement of the head 3.

The outputs $U_2$ (FIG. 3) and $\overline{U}_2$ of $C_2$ are also connected, respectively, with the setting input and the resetting input of a flip-flop $F_3$, whose outputs are connected with the sequence generator $G_S$ (FIGS. 3 and 2).

The output $U_{3B}$ of the circuit $C_{3B}$ (FIG. 3) is connected with the setting input of a flip-flop $F_4$ whose output is, in turn, connected with an oscillator $O_1$ controlled by a potentiometer $P_1$. This potentiometer adjusts the oscillation frequency of the oscillator $O_1$, whose output is connected with the pulse generator $G_1$ (FIGS. 3 and 2). The resetting inputs of the flip-flops $F_1$, $F_2$ and $F_4$ can be grounded, so as to bring about resetting of said flip-flops, by means of a switch R (FIG. 3) manually operated and disposed on the panel 30 (FIG. 6); these flip-flops can also be reset by closing a microswitch $M_1$ (FIG. 3), actuated by the head 3 (FIG. 1) when the latter reaches the position of the end of its backward stroke, with a rapid hydraulic stroke.

The outputs $U_{3C}$ (FIG. 3) and $\overline{U}_{3C}$ of the circuit $C_{3C}$ are connected, respectively, with the setting and resetting inputs of a flip-flop $F_5$ whose output is connected, like that of the oscillator $O_1$, with the pulse generator $G_1$ (FIGS. 3 and 2).

Figure 4:
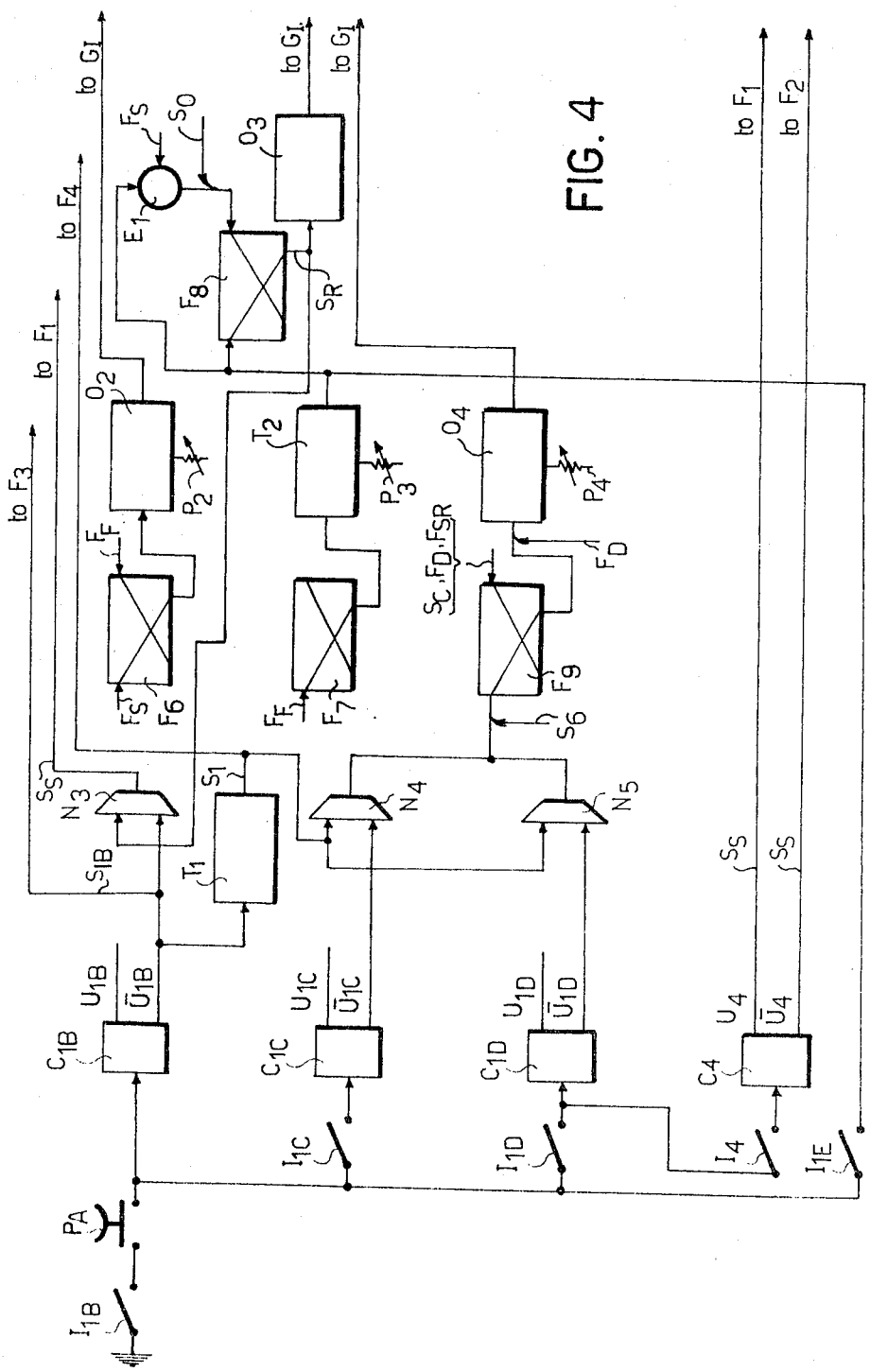
FIG. 4 is a schematic diagram of a second part of the electronic circuit controlling the functions of said machine, and which forms part of the apparatus of FIG. 2.

The second part of the circuit $C_F$, which controls the working cycle, the cutting cycle in air, the sharpening cycle with a sharpening device carried by the cutter-head, the arrest cycle during the return stroke and, finally, the cycle for machining a series of cylindrical portions of different diameter, is illustrated in FIG. 4.

A switch $I_{1B}$, which forms part of the selector $I_1$ (FIG. 6), is mounted in such a manner that, upon its closure, the inlet of a logic circuit $C_{1B}$ and one of the terminals of three switches $I_{1C}$, $I_{1D}$, and $I_{1E}$ will be grounded; the other terminals of these switches are connected with corresponding logic circuits $C_{1C}$, $C_{1D}$ and with the resetting inlet of a flip-flop $F_8$, respectively. Between the switch $I_{1B}$, as well as between said switch and the switches $I_{1C}$, $I_{1D}$ and $I_{1E}$, the starting pushbutton $P_A$ is disposed. The closure of one of the swtiches $I_{1B}$, $I_{1C}$, and $I_{1B}$, $I_D$, (corresponding to setting of the selector $I_1$, of FIG. 6 in the same position) will bring about, respectively, setting of the working cycle, of the cycle of cutting in air, of the sharpening cycle with a sharpening device carried by the grinding-wheel holder and of the cycle with arrest during the return stroke. The constructional arrangement of the selector $I_1$ is such that the switch $I_{1B}$ will be closed simultaneously with the closure of the switches $I_{1C}$, $I_{1D}$ and $I_{1E}$.

The logic circuits $C_{1B}$, $C_{1C}$, and $C_{1D}$ are quite identical to those already examined with reference to the first part of the circuit $C_F$ illustrated in FIG. 3. Another circuit of the same kind, $C_4$, has its input connected with the output terminal of the switch $I_{1D}$ through a switch $I_4$. To the closing and opening positions of this switch, disposed on the panel 30 (FIG. 6), correspond the indications AV and IN, respectively.

The input of a timing circuit $T_1$, is connected with the output $\overline{U}_{1B}$ of the circuit $C_{1B}$, while the output of the same circuit is connected with the setting input of the flip-flop $F_4$ belonging to the first part of the circuit $C_F$ already described with reference to FIG. 3.

An oscillator $O_2$, whose frequency of oscillation can be varied by actuating a potentiometer $P_2$ associated therewith, is controlled by a flip-flop $F_6$, whose setting and resetting inputs are connected with the coincidence circuit $C_C$ (FIG. 2). The output of the oscillator $O_2$ (FIG. 4) is connected with the pulse generator $G_1$ (FIGS. 2 and 4).

Another oscillator $O_3$ (FIG. 4), whose output is also connected with the pulse generator $G_1$, is controlled by a flip-flop $F_8$ whose setting input is connected with the output of a timing circuit $T_2$ which is in turn controlled by a flip-flop $F_7$. This timing circuit is associated with a potentiometer $P_3$ for adjusting its time of "delay."

The setting input of the flip-flop $F_7$ is connected with the coincidence circuit $C_C$ (FIG. 2) while the resetting input of the flip-flop $F_8$ (FIG. 4) is connected with the pulse counter $C_I$ (FIG. 2) and with the output of an AND gate, $E_1$, (FIG. 4), whose two inlets are connected, respectively, with one of the terminals of the switch $I_{1E}$ and the coincidence circuit $C_C$ (FIG. 2).

The inputs of a NOR circuit, $N_3$, are connected with the output $\overline{U}_{1B}$ of the circuit $C_{1B}$ and with the output of the flip-flop $F_8$, respectively. The output of the circuit $N_3$ is connected with the flip-flop $F_1$ (FIG. 3) which is upstream of the amplifier $A_1$, and belongs to the second part of the circuit $C_F$ already described.

The output $\overline{U}_{1C}$ of the circuit $C_{1C}$ is connected with the input of a NOR circuit $N_4$, whose other input is connected with the output of the timing circuit $T_1$. The output of the circuit $N_4$ is connected with the setting input of a flip-flop $F_9$ which controls an oscillator $O_4$ whose frequency of oscillation can be varied by means of a potentiometer $P_4$ associated therewith and whose output is connected with the pulse generator $G_1$ (FIG. 2). The resetting input of the flip-flop $F_9$ (FIG. 4) is connected with the coincidence circuit $C_C$.

The output $\overline{U}_{1D}$ of the circuit $C_{1D}$ is connected with an input of a logic circuit NOR, $N_5$, whose other input is connected with the output of the timing circuit $T_1$; the output of the circuit $N_5$ is connected with the setting input of the flip-flop $F_9$.

The two outputs $U_4$ and $\overline{U}_4$ of the logic circuit $C_4$ are connected with the setting inputs of the flip-flops $F_1$ and $F_2$, respectively, (FIG. 3).

The third part of the circuit $C_F$, which controls the cycle for machining a series of cylindrical portions of different diameter, the "semirapid" cycle, the cycle with displacement of the worktable and the sharpening cycle with a sharpening device fastened tto the table of the machine, is shown in FIG. 5.

The switch $I_{1B}$, which also appears in the circuit of FIG. 4, is adapted to connect to the ground, upon closing of he pushbutton $P_A$, one of the terminals of the switches $I_{1F}$, $I_{1G}$, $I_{1H}$ and $I_{1I}$, each of which forms part of the selector $I_1$. The closure of the aforementioned switches (corresponding to the setting of the selector $I_1$ in the same positions) brings about the setting, respectively, of the cycle for machining a series of cylindrical portions of different diameter, of the "semirapid" cycle, of the cycle with displacement of the worktable and of the sharpening cycle with a sharpening device fastened to the table of the machine. Furthermore, the constructional arrangement of the selector $I_1$ is such that to the closure of each of the aforementioned switches will correspond to the closure of the switch $I_{1B}$. The other terminal of each of the first-mentioned switches is connected with a corresponding logic circuit $C_{1F}$, $C_{1G}$, $C_{1H}$; these circuits are quite similar to those already examined with reference to the first and the second part of the circuit $C_F$, shown in FIGS. 3 and 4.

Another logic circuit of the same kind, $C_5$, has its input connected, through a switch $I_5$, with the output terminal of the switch $I_{1H}$, to which terminal the output terminal of the switch $I_{1I}$ is also connected. The opening and closing positions of the switch $I_5$, which is disposed on the panel 30 (FIG. 6), correspond to the indications or displays "1" and "2" respectively, which will be discussed below.

The output $U_{1F}$ of the circuit $C_{1F}$ is connected with the setting input of a flip-flop $F_{10}$ which controls an oscillator $O_5$ whose output is connected with the pulse generator $G_I$ (FIG. 2). The oscillator $O_5$ (FIG. 5) is an oscillator adapted to generate oscillations whose frequency increases as a substantially linear function, with the increase of the time of operation of the same oscillator, until it reaches a maximum value which remains nearly constant. Upon reaching this maximum value, by applying to the oscillator $O_5$ an appropriate signal, said frequency can be decreased as a function of time, substantially still linearly, until a very small value is reached which will remain nearly constant. Said signal will arrive to the oscillator $O_5$ from the counter $C_I$ (FIG. 2) to which it is connected.

The output $\overline{U_{1G}}$ of the circuit $C_{1G}$ is connected with the input of a NOR logic circuit $N_6$, whose other input is connected with the timing circuit $T_1$ (FIG. 4); the output of the circuit $N_6$ is connected with the oscillator $O_4$ (FIG. 3).

The output $\overline{U_{1H}}$ of the circuit $C_{1H}$ is connected with one of the inputs of a NOR circuit $N_7$, whose other input is connected with one terminal of a microswitch $M_2$; the other terminal of this microswitch is grounded. Said microswitch is adapted to close upon reaching one of the end-of-stroke positions of the table of the machine. The output of the circuit $N_7$ (FIG. 5) is connected with the input of a timing circuit $T_3$, whose time of "delay" can be adjusted by means of a potentiometer $P_5$, associated therewith. The output of said circuit is connected with the setting input of a flip-flop $F_{11}$ which controls an amplifier $A_3$ whose output is in turn connected with an electric control valve $EV_3$.

This electric control valve controls the feeding of pressure fluid to the fluodynamic cylinder (not shown) which controls the reciprocating movement of the table of the machine; when said electric valve is energized, then the feeding of fluid to said cylinder is allowed and the table begins to move.

An oscillator $O_6$ (FIG. 6), whose output is connected with the pulse generator $G_I$ through a gate circuit $E_8$, is controlled by a flip-flop $F_{12}$, to whose setting input the output of two AND gates $E_2$ and $E_3$ are connected. The inputs of the first-mentioned gate are connected, through a counter $C_6$, with one of the terminals of the microswitch $M_2$, and with the output $\overline{U_5}$ of the logic circuit $C_5$, respectively; the inputs of the second-mentioned gate are connected with one of the terminals of said microswitch and with the output of the circuit $C_5$, respectively. The resetting input of the flip-flop $F_{11}$ is also connected with one of the terminals of the microswitch $M_2$. The latter is also connected, through a gate $E_7$, a pulse shaping circuit $C_7$ which is, in turn, connected with the counter $C_I$.

The counter $C_I$ is adapted to generate a signal on the output connected with the gate $E_2$, only after its input has received two pulses.

The output $H_{1H}$ of the circuit $C_{1H}$ is also connected with the input of three AND gates, $E_4$, $E_5$ and $E_6$, respectively, whose other inputs are connected with the coincidence circuit $C_C$. The outputs of said gates are connected with the setting devices $M_{IS}$, $M_{IF}$, and $M_{IV}$, respectively.

The operation of the machine during one of the cycles described above is as follows:

First, each working cycle starts and ends in a correspondence with the position of the end of the backward stroke of the screw 18 (FIG. 1), i.e., when the piston 20 of the hydraulic cylinder 14 is in the position of the end of his backward stroke, as shown in FIG. 1.

Assume further that the machine is provided with means adapted to arrest the screw 18 (or the piston 20) at the end of its forward stroke in an exact manner and always in the same position. This can be attained, for instance, by means of a stop, not shown in the drawings, which is integral with the bed 1 and with which cooperates a portion of the screw 18.

In order to accomplish one stepup cycle, the mode of operation is set on the panel 30 (FIG. 6) of the machine by means of the selector $I_1$, by bringing the pointer of the latter to the position $I_{1A}$, to which corresponds, in the diagram of FIG. 3, the closure of the switch designated in the same manner. On the same panel, must then be set, by means of the selector $I_2$, the direction (forward or backward) in which the movement of the cutterhead is desired (3, FIG. 1); by assuming, for instance, to bring said selector in the FORWARD position, to this position will correspond, in the diagram of FIG. 3, the closure of the switch designated in the same manner. Finally, by means of the selector $I_3$ (FIG. 6), one the three following displacements of the cutterhead 3 must be set: rapid hydraulic displacement (position $I_{3A}$) actuated by the cylinder 14 (FIG. 1), slow continuous displacement actuated by a sequence of pulses sent to the motor M (position $I_{3B}$) or a slow displacement obtained by applying single pulses to the motor M (position $I_{3C}$). The choice of one of the three positions mentioned above corresponds to the closure of one of the three switches $I_{3A}$, $I_{3B}$ and $I_{3C}$ of the diagram of FIG. 3.

Assuming to have chosen, for instance, the rapid hydraulic movement, according to the modes of operation of the logic circuits $C_2$ and $C_{3A}$ described above, on the outputs $\overline{U_2}$ of $C_2$ and $\overline{U_{3A}}$ of $C_{3A}$ signals of logical value equal to 0 will be present, whereas on the other outputs of the same circuits, signals of logical value equal to 1 will be present. Therefore, two signals of logical value 0 will reach the circuit $N_1$ and, accordingly, on its output a signal will be present which is able to energize the flip-flop $F_1$, which, in turn, actuates the amplifier $A_1$; this amplifier will energize the electric value $EV_1$ (FIGS. 1 and 3) which, as stated above, permits the flow of pressure fluid through the duct 27 (FIG. 1) in the cylinder 14, thereby, causing the forward movement of the piston 20 and, therefore, of the head 3 in the same direction. The parts integral with the cutterhead 3, illustrated in FIG. 1, will reach, therefore, the positions shown in dotted lines.

In the above conditions, from the circuits $C_2$ and $C_{3A}$ (FIG. 3) signals of different logical value will reach the circuit $N_2$ and, therefore, the output from said circuit is inhibited.

Assuming now to dispose the selector $I_2$ (FIG. 6) in the IN position (switch $I_2$ of FIG. 2 open) and to leave the switches $I_{1A}$ and $I_{3A}$ still closed, then the output of the circuit $N_2$ will be enabled and the output of the circuit $N_1$ will be inhibited, as can be easily seen, by observing that, in this instance, the logical values of the signals from the outputs of the logic crcuit $C_2$ are exchanged. In this manner, the flip-flop $F_2$ will be energized, which, in a manner quite similar to that described with reference to the flip-flop $F_1$, will activate the corresponding amplifier $A_2$ which, in turn, actuates the electric valve $EV_2$ (FIGS. 1 and 3) to feed pressure fluid to the duct 28 (FIG. 1) of the cylinder 14, thereby causing the rapid backward movement of the head 3.

In order to obtain the continuous slow movement of the head 3, instead of the rapid hydraulic movement of the same, in a predetermined direction, the selector $I_3$ (FIG. 3) is brought to the position $I_{3B}$, to which the closure of the switch designated in the same manner in FIG. 3 corresponds, and the selectro $I_2$ in one of the two positions "AV" or "IN" while the setting device $I_1$ remains set in the position $I_{1A}$. The signal from the output $U_{3B}$ of the circuit $C_{3B}$, of logical level equal to 1, is able to energize the flip-flop $F_4$ which will activate the oscillator $O_1$, whose pulses will reach, through the pulse generator circuit $G_1$ (FIG. 2), the sequence generator $G_S$, which is also reached by a signal coming from one of the outputs of the flip-flop $F_3$ (FIG. 3). This flip-flop is energized by the signal from the output $U_2$ of $C_2$ if the switch $I_2$ is closed (setting device $I_2$ in the position "AV", while the same will be reset by the signal from the output $\overline{U}_2$ of $C_2$ if said switch is open. The signals from the two outputs of the flip-flop $F_3$ are utilized in the frequency generator $G_S$ to modify the signals sent by the same to the power circuit $C_P$, where they are amplified, will also contain an indication for the direction of rotation of the motor M. In this manner, when the pushbutton $P_A$ (FIG. 3) is pressed down, a sequence of pulses will reach the motor M, whose duration is equal to the time during which said pushbutton is held pressed down. These pulses cause the shaft of said motor M (FIG. 1) to rotate through a predetermined angle; as a result, through the reduction unit 25, the gears 24 and 22, and therefore, also the screw 18 will be caused to rotate, thereby, causing a micrometric displacement of a cutterhead 3 relative to the platform 12.

To accomplish the slow displacement of the cutterhead 3 in a predetermined direction, actuated by sending a single pulse (or a number of subsequent pulses), the selector $I_3$ (FIG. 6) is switched to the position $I_{3C}$, corresponding to the closure of the switch designated in the same manner in FIG. 3. In this instance, the signal from the output $U_{3C}$ of the circuit $C_{3C}$ will energize the flip-flop $F_5$, from whose output a signal is sent to the pulse generator $G_I$ (FIG. 2) which will generate, this time, a single pulse to be sent to the motor M. The signal from the output $\overline{U}_{3C}$ (FIG. 3) of the circuit $C_{3C}$ will reset the flip-flop $F_5$, so that, each time the pushbutton $P_A$ is pressed down, a new signal can be emitted by said flip-flop $F_5$, which causes the pulse generator $G_I$ to produce a subsequent pulse for the motor M.

The flip-flops $F_1$, $F_2$ and $F_4$ are reset by pressing down the pushbutton R (FIGS. 6 and 3), which connects to the ground each resetting input of said flip-flops. Resetting of the same flip-flops can also be attained by means of the microswitch $M_1$ (FIG. 3), which closes when the head 3 (FIG. 1) reaches, with a rapid hydraulic stroke, the position of the end of its rearward stroke.

As already stated, during the setup cycle the resetting position is fixed from which the measurement of the displacements of the head 3 relative to the workpiece starts in a subsequent working cycle. The measurement of these displacement is made by counting the pulses sent to the motor M, by means of the counter $C_I$. In order to fix the resetting position, it will be sufficient to reset the counter $C_I$: this counter can be connected with a pushbutton A (FIG. 6), so that said resetting will be accomplished after the rapid forward stroke of the head 3 has taken place (position of the end of the forward stroke of the piston 20 and of the screw 18) and in any desired position of the head 3 relative to the screw 18.

After the zero position has been fixed, all the subsequent displacements of the cutterhead 3, starting from the aforementioned position, are controlled by the counter $C_I$. In particular, even if the head 3 is brought back to the position of the end of its rearward stroke by means of the cylinder 14, the resetting position fixed previously will be maintained.

To each pulse sent to the motor M and the counter $C_I$ there corresponds a predetermined displacement of the cutterhead 3 (FIG. 1) relative to the screw 18, that is to say a predetermined micrometric displacement of said head. Preferably, this predetermined displacement is of 0.001 mm. Therefore, in the following description mention will be made indifferently of pulses or of displacement, since the former are proportional to the latter.

In order to setup the machine to carry out a working cycle automatically, the selector of the mode of operation $I_1$ (FIG. 6) is set to the position $I_{1B}$, to which the closure of the switch of the circuit of FIG. 4 corresponds, designated in the same manner. On the setting devices $M_S$ and $M_F$ (FIGS. 6 and 2) the value of the thickness of material to be removed during the roughing-out operation and the value of the overall thickness are set; the difference between the latter and the former of these values represents the thickness of material to be removed during the finishing operation. The roughing-out and finishing speeds, at which the tool must advance towards the workpiece, are adjusted by actuating the potentiometers $P_1$ and $P_2$, respectively.

As soon as the pushbutton $P_A$ (FIG. 4) is pressed down, two signal of logical level 0 will reach the NOR circuit $N_3$, since this level is that of the output $\overline{U}_{1B}$ of $C_{1B}$ and because the flip-flop $F_8$, as will be described below, it not energized. Therefore, from the circuit $N_3$ a signal $S_S$ will be sent to the flip-flop $F_1$ (FIG. 3) which actuates, as already stated, the amplifier $A_1$ which in turn will energize the electric valve $EV_1$, thereby causing the rapid hydraulic displacement of the head 3 (FIG. 1), until the piston 20 and the screw 18 are brought in the position of the end of their forward stroke.

Simultaneously, the signal present at the output $\overline{U}_{1B}$ (FIG. 4) of $C_{1B}$ energizes the timing circuit $T_1$, whose delay time interval is chosen so that a signal $S_1$ will be emitted therefrom only after completion of the rapid forward hydraulic stroke (or a predetermined part of the same) by the piston 20 (FIG. 1) and the screw 18. The signal $S_1$ is sent to the setting input of the flip-flop $F_4$ (FIG. 3), which activates the oscillator $O_1$ which, in the manner already described, is adapted to cause the motor M to rotate continuously by sending a sequence of pulses thereto. The frequency of the oscillator $O_1$ is such as to attain the feed speeds of the cutterhead 3 as required for the roughing-out operation. The signal from the output $\overline{U}_{1B}$ of $C_{1B}$ (indicated with $S_{1B}$) is also sent to the setting input of the flip-flop $F_3$ (FIG. 3) in order to set the sequence generator $G_S$ (FIG. 2) so that the direction of rotation of the motor M will be such as to determine the forward movement of the cutterhead 3 (FIG. 1).

The pulses sent to the motor M are also sent, from the power circuit $C_P$ (FIG. 2), to the counter $C_1$ which counts the same. The counter $C_1$ and the visualizer V will give, therefore, an overall indication of the actual displacement of the cutterhead 3 starting from the position where it was when the motor M was started. When the number of the pulses counted by said counter is coincident with the value set on the setting device $M_S$, the coincidence circuit $C_C$ will emit a signal for roughing-out completion $F_S$ which is sent to the setting input of the flip-flop $F_6$, (FIG. 4), which will activate the oscillator $O_2$. The signals from said oscillator $O_2$, which are sent to the pulse generator $G_I$ (FIG. 2), are adapted — in a manner quite similar to the generator $O_1$ — to start the motor M. Since the frequency of oscillation of said oscillator, adjustable by means of the potentiometer $P_2$ is lower than that of the oscillator $O_1$, the feed speed of the cutterhead 3 will be lower than the preceding speed and will correspond to that required for the roughing-out operation. The signal $F_S$ is also sent to the resetting input of the oscillator $F_4$, (FIG. 3) to disactivate the oscillator $O_1$.

The pulses generated by the oscillator $O_2$ (FIG. 4) are further counted by the counter $C_I$ (FIG. 2) and added to those already totalized by the same. When the number of the pulses counted by $C_I$ correspond to the value set on the setting device $M_F$ (final dimension), then the coincidence circuit $C_C$ will generate a signal of finishing completion $F_F$ which is sent to the resetting input of the flip-flop $F_6$ (FIG. 4) to disactivate the oscillator $O_2$ and to the resetting input of the flip-flop $F_7$ to activate the timing circuit $T_2$. The delay time interval of said circuit is chosen so as to permit to the tool to remain in contact with the workpiece for a predetermined period of time (dwell time) in order to improve the surface finishing of the piece. Upon expiration of the dwell time, set on the potentiometer $P_3$, the circuit $T_2$ will emit a signal which activates the flip-flop $F_8$, so that the same will generate a return signal $S_R$ which activates the oscillator $O_3$ and is simultaneously sent to the circuit $N_3$ to inhibit the output of the latter.

The signal $S_R$ is also sent to the resetting input of the flip-flop $F_3$ (FIG. 3) which, in such conditions, holds the sequence generator $G_S$ (FIG. 2) set in such a manner as to cause the pulses sent to it by the pulse generator $G_I$ and coming from the oscillator $O_3$, to start the motor M in a direction opposed to that in which it rotated previously (return movement of the cutterhead 3). The signal $S_R$ is also sent to the setting input of the flip-flop $F_2$ (FIG. 3) which controls, as already stated, the rapid hydraulic rearward displacement of the head 3 (FIG. 1). Therefore, from the instant when the signal $S_R$ appears, a rapid hydraulic rearward movement of the head 3 will begin, simultaneously with a displacement of said head, in the same direction, relative to the screw 3, actuated by the motor M and controlled by the oscillator $O_3$ (FIG. 4).

During the aforementioned rearward movement, the pulses sent to the motor M are also counted by the counter $C_I$, which will subtract the same from the pulses present therein prior to the actuation of the oscillator $O_3$; said counter is adapted to generate a resetting signal $S_0$ when all the six decades of the same counter are set to zero. The signal $S_0$ is sent to the resetting inlet of the flip-flop $F_8$ (FIG. 4), which will disable the oscillator $O_3$, thereby arresting the rotation of the motor M.

The cycle described above will terminate when the piston 20 (FIG. 1) and the screw 18 will reach the position of the end of their rearward stroke and when the counter $C_I$ is reset. It will be therefore obvious that the resetting position, which has been fixed at the start of the cycle, is maintained until the end of said cycle.

In order to set up the machine to automatically accomplish a cutting cycle in air, the selector $I_1$ (FIG. 7) is brought to the position $I_{1C}$, and as in the preceding cycle, the values of the thickness to be removed during the roughing-out operation and the overall thickness of material to be removed are set on the setting devices $M_S$ and $M_F$, respectively; by adjusting the potentiometers $P_1$ and $P_2$, it is also possible to set predetermined roughing-out and finishing speeds.

The setting of the selector $I_1$ in the position $I_{1C}$ corresponds, as already stated, to the simultaneous closure of the switch $I_{1B}$, and the switch $I_{1C}$ in the circuit of FIG. 4. Therefore, as soon as the pushbutton $P_A$ is pressed down, the working cycle described above will start. When this cycle has reached the point in which the circuit $T_1$ emits the signal $S_1$, from the circuit $N_4$ can come a signal which energizes the flip-flop $F_9$ and the latter activates the oscillator $O_4$. The signal from the oscillator $O_4$ actuates, through the pulse generator $G_I$ (FIG. 2) — in a manner quite identical to that already described — the rotation of the motor M with a speed which is established by the frequency of oscillation of the oscillator $O_4$, and can be varied within a predetermined range by operating the potentiometer $P_4$, said frequency being such that the motor M will rotate at a speed noticeably higher than its speed of rotation during the working stages, under the control of the oscillators $O_1$ and $O_2$.

As soon as the workpiece comes into contact with the tool, an appropriate transducer (not shown) emits a contact signal $S_C$ which is sent to the resetting input of the flip-flop $F_9$ to disable the oscillator $O_4$, and to the setting input of the flip-flop 4 (FIG. 3) to activate th oscillator $O_1$ and to start the roughing-out operation of the workpiece, as described above. From this point on the cycle will proceed as in the case of the working cycle already described; the roughing-out operation is followed by the finishing operation and, after the dwell time, the return movement of the screw 12 relative to the platform 12 (FIG. 1) and of the head 3 relative to the same screw will start.

The transducer which generates the signal $S_C$ sent to the flip-flop $F_9$ can be any transducer of known kind adapted to emit a signal when the tool comes into contact with the workpiece. Preferably, this transducer senses the variation of the phase difference between voltage and current fed to the motor which actuates the rotation of the tool when, upon the contact of the latter with the workpiece, the restoring torque applied to said tool increases.

In order to set up the machine for automatically effecting a sharpening cycle with a sharpening tool carried by the cutterhead, the selector $I_1$ (FIG. 6) is brought to the position $I_{1D}$ and the selector $I_4$ is brought to one of the two positions "AVANTI" or "INDIETRO". The aforementioned setting of the selector $I_1$ corresponds to the closure of the switches $I_{1O}$ and $I_{1B}$ of the circuit of FIG. 4, whilst the settings of the selector $I_4$ in the positions "AVANTI" and "INDIETRO" will correspond to the positions of closure and opening, respectively, of the switch $I_4$ in the circuit of the same figure.

After choosing the value of the thickness of material to be removed with said sharpening operation, then the same value is set on the setting device $M_R$. Only the two last decades at the R.H. of said setting devices are adapted to receive settings of the aforementioned value (normally highly reduced) and, therefore, this value must be set on said decades.

As already stated, the sharpening operation can be carried out either with the tool in proximity of the workpiece (screw 18, FIG. 1, in the position of the end of the forward stroke) or with the tool at a distance from the workpiece (screw 18 in the position of the end of the backward stroke). When the cycle is started, by pushing down the pushbutton $F_4$ (FIG. 4), if the switch $I_4$ is closed, the output $U_4$ of the circuit $C_4$ will emit a displacement signal $S_S$ which is sent to the setting input of the flip-flop $F_1$ (FIG. 3), thereby actuating, as already described, the rapid hydraulic forward displacement of the head 3 (FIG. 1). If, instead, the switch $I_4$ (FIG. 4) is open, then the output $\overline{U}_4$ of the same circuit will emit a displacement signal $S_S$ which, upon being sent to the setting input of the flip-flop $F_2$ (FIG. 3), will actuate — as already described — the rapid hydraulic rearward displacement of the head 3. In one of the two aforementioned positions sharpening of the tool will take place, by means of the sharpening device carried by the cutterhead.

When the starting pushbutton $F_A$ (FIG. 5) is pressed down, besides the circuit $C_{1D}$ also the circuit $C_{1D}$ is energized; this latter circuit provides for carrying out the first part of the working cycle in the manner already described. When the circuit $T_1$ emits the signal $S_1$, this signal will also energize the NOr circuit $N_5$ to which, besides said signal, another signal from the output $\overline{U}_{1D}$ of the circuit $C_{1D}$ will also be applied. In this manner, from the S6 output of the circuit $N_5$ a signal is sent to the setting input of the flip-flop $F_9$ in order to activate the oscillator $O_4$. This oscillator, as already described with reference to the preceding cycle, will set the motor N in rotation, thereby causing a forward displacement of the cutterhead 3 relative to the screw 18.

The pulses applied to the motor M are counted by the counter $C_1$ (FIG. 2) and, when the number of pulses counted by said counter is equal to the value set on the two first decades to the right of the setting device $M_R$, the coincidence circuit $C_C$ will emit a signal of sharpening completion $F_D$ which is sent to the resetting inlet of the flip-flop $F_9$ (FIG. 4), thereby stopping the operation of the oscillator $O_4$.

In this manner, at the end of the cycle, the cutterhead 3 has undergone a forward displacement relative to the screw 18 (FIG. 2), which is equal to the thickness of material removed from the tool during the sharpening operation. Therefore, at the end of the sharpening operation, the active surface of the tool will be in the same position, relative to the workpiece, in which it was before starting the sharpening operation.

In order to set up the machine for automatically carrying out one cycle with arrest during the return stroke, the selector $I_1$ (FIG. 6) is brought to the position $I_{1E}$ and, since said cycle — as already stated — constitutes a continuation of the working cycle (during whose return stroke the tool is arrested), the settings required for this latter cycle have to be effected as well. To the setting of $I_1$ on $I_{1E}$ the closure of the switches $I_{1B}$ and $I_{1E}$ of the circuit of FIG. 4 will correspond.

When the starting pushbutton $P_A$ is pressed down, then the working cycle will start, which will continue in the manner already described.

During the return stroke of the cutterhead 3 (FIG. 1) when, during the reverse count of the pulses made by the counter $C_I$ (FIG. 2), the number of pulses on said counter corresponding to the value set on the setting device $M_S$ (thickness of material removed by the roughing-out operation), the coincidence circuit $C_C$ will emit the signal $F_S$ again. This signal is sent to one of the inputs of the gate $E_1$ (FIG. 4), on whose other input a signal is present, sent by the switch $I_{1E}$ which is closed. Therefore, from the output of said gate a signal is sent to the resetting input of the flip-flop $F_8$ which arrests the operation of the oscillator $O_3$ that, as stated above, controls the return of the cutterhead 3.

In this manner, said cutterhead 3 is stopped in a position such that the distance between the workpiece and the active surface of the tool is equal to the thickness of metal removed during the finishing cut effected during the preceding working cycle.

At this point, by operating the devices provided in the machine, the workpiece will be displaced axially relative to the tool, thereby bringing the shoulder adjacent to the cylindrical portion just machined, in contact with one of the side surfaces of the tool, in order to machine said shoulder. Upon completion of the machining operation, the workpiece is again displaced axially, thereby removing the same from the tool; subsequently, by again pressing down the starting pushbutton $F_4$ (FIG. 4), a signal is thus sent to the setting input of the flip-flop $F_8$, which will again activate the oscillator $C_3$ in order to start once more, with the modalities described with reference to the working cycle, the return stroke of the cutterhead 3 from the point where the same had been interrupted previously.

In order to set up the machine for automatically carrying out one cycle for machining a series of cylindrical portions of different diameter, the selector 6 (FIG. 6) is brought to the position $I_{1F}$ to which the closure of the switches $I_{1B}$ and $I_{1F}$ in the circuit of FIG. 6 corresponds. The difference between the radii of the first two cylindrical portions, adjacent to one another, which must be machined, is set on the setting device $M_R$; since this difference may also be high, said setting device is arranged to receive the setting of the aforementioned difference on its six decades.

Assume now that the working cycle has already been completed, during which one of said two cylindrical portions has been machined and that the workpiece has been displaced longitudinally relative to the cutterhead 3 so as to bring the other portion in correspondence with the tool.

By pressing down the pushbutton $P_A$ (FIG. 5), as in the preceding cycles, since - upon closing of the switch $I_{1B}$ — the circuit $C_{1B}$ is energized, which actuates the working cycle, the cutterhead 3 (FIG. 1) will be caused to advance with a rapid hydraulic stroke, from the position of the end of its rearward stroke to that of the end of its forward stroke. Simultaneously, the signal coming from the output $U_{1F}$ (FIG. 5) of the circuit $C_{1F}$ will activate the flip-flop $F_{10}$ which enables the oscillator $O_5$. As already stated, said oscillator is arranged for generating pulses whose frequency increases, substantially linearly, until it reaches a value which will remain constant. These pulses, sent to the pulse generator $G_I$ (FIG. 2), will start the rotation of the motor M with a speed proportional to the aforementioned frequency. When the number of pulses counted by the counter $C_I$ differs by a predetermined number of pulses from the value set on the setting device $M_R$, then the coincidence circuit $C_C$ will emit a signal $F_A$ which is sent to the oscillator $O_5$ (FIG. 5). Upon arrival of said signal, the frequency of the oscillator will decrease, substantially linearly, until it reaches a small final value which remains constant.

Therefore, during the approaching stroke of the cutterhead 3 (FIG. 1) to the portion to be machined, the speed of said head, controlled by the oscillator $O_5$, will first increase, then will reach a constant value and finally will decrease again to a very small constant value when the tool is in immediate proximity of the workpiece. In this manner, the inertia forces of the cutterhead 3 will be considerably reduced, both at the start and at the end of said stroke. When the number of pulses counted by the counter C (FIG. 2) becomes equal to the value set on the setting device $M_R$, then the coincidence circuit $C_C$ will emit a signal $F_R$ which indicates that the active surface of the tool is in contact with the surface to be machined. The signal $F_R$ is applied to both the resetting input of the flip-flop $F_{10}$ (FIG. 5), in order to disable the oscillator $O_5$, and to the setting input of the flip-flop $F_2$ (FIG. 3) in order to enable the oscillator $O_2$ and to actuate the rapid hydraulic return movement of the cutterhead 3 (FIG. 1).

In order to set up the machine for automatically carrying out a "semirapid" cycle, the selector $I_1$ (FIG. 6) is brought to the position $I_{1G}$ and on the first four decades, starting from the right, of the setting device $M_R$ the "semirapid" displacement is set which, as already stated, is effected at a speed higher than the roughing-out and finishing speed of the working cycle. To the setting of the selector $I_1$ on $I_{1G}$ the closure of the switches $I_{1B}$ and $I_{1G}$ of the circuit of FIG. 5 corresponds.

When the starting pushbutton $F_A$ (FIG. 5) is pushed down, then the circuit $C_{1B}$ is energized (FIG. 4) and the working cycle is started, which continues until the instant when the circuit $T_1$ will emit the signal $S_1$ which is applied to the circuit $N_6$ (FIG. 5) to energize the same. The signal $S_6$ from the circuit $N_6$ is sent to the setting inlet of the flip-flop $F_9$ (FIG. 9) to activate the oscillator $O_4$ which, in the manner already described, will cause the motor M to rotate at a predetermined speed.

When the number of pulses counted by the counter $C_I$ (FIG. 2) is equal the value set on the setting device $M_R$, then the coincidence circuit $C_C$ will emit a signal of end of the semirapid cycle $F_{SR}$, which is sent to the resetting input of the flip-flop $F_9$ (FIG. 4) to disable the oscillator $O_4$, and to the setting input of the flip-flop $F_4$ (FIG. 3) to activate the oscillator $O_1$ and thereby to start a sequence of steps which is quite identical to that of the working cycle described previously.

In order to set up the machine for automatically carrying out a cycle with displacement of the table, the selector $I_1$ is brought to the position $I_{1H}$ (FIG. 6), to which the closure of the switches $I_{1B}$ and $I_{1H}$ of the circuit of FIG. 5 corresponds; the selector $I_5$ (FIG. 6) is brought to one of its two positions marked with "1" or "2" on the panel 30; in correspondence with the first of these positions, the cutterhead 3 (FIG. 1) advances towards the workpiece at the end of each longitudinal displacement of the table, while in correspondence with the other position said displacement occurs at the end of two longitudinal displacements of said table. On the setting device $N_S$ the thickness of metal is set which must be removed from the workpiece during the roughing out operation, while on the setting device $M_F$ the overall thickness of metal to be removed is set. On the setting devices $M_{IS}$, $M_{IF}$ the displacement increments are set with which the cutterhead 3 (FIG. 3) must be fed forward at the end of each displacement (or of two displacements) of the table in longitudinal direction, during the roughing-out or the finishing operation, respectively. On the setting device $M_{IV}$ (FIGS. 2 and 6) the number of "idle cuts" is set, that is to say the number of the strokes effected by the table relative to the tool with no displacement of the cutterhead 3.

The pulses corresponding to the settings made on the setting devices $M_{IS}$, $M_{IF}$ and $M_{IV}$ (FIG. 2) are counted, in said working cycle, on the first two decades at the L. H. and on the second decade at the L. H., respectively, by the counter $C_I$. The numerical or digital contents of said decades is set to zero upon each longitudinal displacement of said table, by means of a signal generated by the microswitch $M_2$. Each time the number of pulses counted by said counter on the aforementioned decades is equal to the number set on one of said setting devices, then the coincidence circuit $C_C$ will emit a signal to be discussed below. The pulses thus counted are transferred in the first four decades at the R. H. side of said counter. With such constructional arrangement of the counter $C_I$ it is possible to utilize a simple counter to count both the incrementa of displacement of roughing-out and finishing, and the number of "idle cuts," as well as the overall displacements effected during the cycle with displacement of the table.

When the starting pushbutton $P_A$ is pressed down (FIG. 5), since the circuit $C_{1B}$ (FIG. 4) is energized (switch $I_{1R}$ closed), then the cutterhead 3 (FIG. 1) — as in the preceding cycles — will be displaced, with a rapid hydraulic stroke, from the position of the end of its rearward stroke to the end of its forward stroke.

Simultaneously, since the microswitch $M_2$ (FIG. 5) is open, to the input of the circuit $N_7$ two signals of logical value zero will be applied and, therefore, from the output of said circuit a signal is emitted which will energize the timing circuit $T_3$; from the output of said circuit, after a predetermined delay time interval, a signal is emitted which will energize the flip-flop $F_{11}$; the latter will, in turn, activate the amplifier $A_3$ which actuates the electric valve $EV_3$. As already stated, this electric valve controls the feed of pressure fluid to the fluodynamic cylinder (not shown) which actuates the longitudinal movement of the table of the machine and, therefore, the movement of said table will start.

When the table reaches the end of its stroke, then the microswitch $N_2$ will be closed (FIG. 5), thereby connecting to the ground the resetting input of the flip-flop $F_{11}$ which inhibits the operation of the amplifier $A_3$, thereby arresting the movement of the table. Assume now that the switch $I_5$ is closed (position "1" on the panel 30 of FIG. 6); in this condition, the signal emitted from the output $U_5$ of the circuit $C_5$ and that obtained by the closure of the microswitch $N_2$ will energize both the inputs of the gate $E_3$, whose output will then emit a signal which, in turn, will energize the flip-flop $F_{12}$ thereby activating the oscillator $O_6$. The output of this oscillator will emit a signal which is sent to the pulse generator $G_I$ (FIG. 2) through the gate $E_8$ enabled by the signal $\overline{F_S}$, since the circuit $C_C$ has not yet generated the signals $F_S$ and $F_F$. This will set the motor M in rotation, in the manner already described and at a speed depending on the frequency of oscillation of the oscillator $O_6$; in this manner, the forward movement of the cutterhead 3 towards the workpiece is obtained.

At this point of the cycle, of the three gates $E_4$, $E_5$ and $E_6$ (FIG. 5) — each of which is arranged to activate one of the setting devices $M_{IS}$, $M_{IF}$ and $M_{IV}$ (FIG. 2), respectively, and is connected with the coincidence circuit $C_C$ to receive from the same the signals $\overline{F_S}$ (denied signal of $F_S$), $F_S$ and $F_F$, respectively — only the gate $E_4$ is opened, being present the signal $\overline{F_S}$.

As a result, of the three setting devices mentioned above, only the setting device $M_{IS}$ (FIG. 2) is activated and, therefore, when the number of pulses counted by the counter $C_I$ is equal to the value set on the setting device $M_{IS}$, then the coincidence circuit $C_C$ will emit a signal of end of roughing-out increment $F_{IS}$, which is sent to the resetting input of the flip-flop $F_{12}$ (FIG. 5) in order to disable the oscillator $O_6$ and thereby arrest the forward movement of the cutterhead 3.

When an interval of time equal to the "delay" realized by the circuit $T_3$ has elapsed, this circuit will emit a signal which energizes again the flip-flop $F_{11}$ and activetes the amplifier $A_3$, whereby pressure fluid is again fed to the hydraulic cylinder which actuates the movement of the table. In this manner a subsequent stroke of the table will start, in the direction opposite to that mentioned previously, inasmuch as the direction of displacement of said table is inverted at the end of each stroke of the same, with a device of conventional kind commonly used in the machine tools. At the end of said stroke, the steps described above will be repeated and, therefore, a subsequent increment of displacement of the cutterhead 3 will occur relative to the workpiece. When the table has completed a predetermined number of strokes, equal to the ratio of the value set on the setting device $M_S$ to that set on the setting device $M_{IS}$ and, therefore, by means a sequence of displacement of said cutterhead 3, the dimension of the end of roughing-out has been reached, then the coincidence circuit $C_C$ will emit the signal of the end of roughing-out $F_S$ which, with the signal from the output $U_{IH}$ of $C_{IH}$, will open the gate $E_5$ thereby activating the setting device $M_{IF}$ (FIG. 2). Now, since none of the inlets of the gates $E_4$ (FIG. 5) and $E_6$ is reached by any F signal coming from the coincidence circuit $C_C$ (FIG. 2), these gates will remain closed and, as a consequence, the other two setting devices $M_{IS}$ and $M_{IV}$ are not activated.

At this point the steps just described will be repeated, but with the difference that, at the end of each stroke of the table an increment of displacement of the cutterhead 3 towards the workpiece occurs, which is equal to that set on the setting device $M_{IF}$; at the end of each displacement of the wheel holder head, equal to the value set on $M_{IS}$, the coincidence circuit $C_C$ (FIG. 2) will emit a signal of end of the finishing increment $F_{IF}$, which is also applied to the resetting input of the oscillator $O_6$ (FIG. 5). In this manner, a number of finishing cuts is effected which is equal to the ratio of the predetermined finishing displacement (i.e., equal to the difference between the indications or displays given by the setting devices $M_F$ and $M_S$) to the value set on the setting device $M_{IF}$.

When the number of pulses counted by the counter $C_I$ (FIG. 2) is equal to that set on the setting devices $M_F$, then the coincidence circuit $C_C$ will emit the signal of end of finishing $F_F$ which, in a manner similar to that described above, will open the gate $E_6$ and close the gates $E_4$ and $E_5$. The gate $E_6$ will enable the setting device $M_{IV}$. Simultaneously, the signal $F_F$ will enable the gate $E_7$, whereby the microswitch $M_2$ will activate, upon each closure thereof, the pulse shaping circuit $C_7$ which sends the pulses to the counter $C_I$. The number set on $M_{IV}$ is thus compared, on the circuit $C_C$, with the number of pulses generated by the microswitch $M_2$ upon each longitudinal displacement of the table. When the two signals are coincident, the circuit $C_C$ will send a signal $F_C$ to the resetting input of the flip-flop $F_{11}$, thereby arresting the movement of the table. Thus, a predetermined number of strokes of the table may occur without any displacement of the cutterhead 3 towards the workpiece at the end of each of thes strokes, because the gate $E_8$ is inhibited.

In the case when the switch $I_5$ (FIG. 5) is kept in its opened position (position "2" on the panel 30 of FIG. 6), then the gate $E_3$ will remain closed whilst the gate $E_2$ is opened; from this gate a signal will be emitted upon each two displacements of the machine table. In fact, the counter $C_8$ is arranged to emit a signal only after receiving a pair of pulses, corresponding to two subsequent closures of the microswitch $M_2$. In this manner, only one increment of movement of the wheel holder head 3 towards the workpiece each two strokes of the table will occur.

In order to set up the machine for carrying out a sharpening cycle with a sharpening device fastened to the machine table, the selector I is brought to the position $I_{11}$ (FIG. 6), to which the closure of the switches $I_{1B}$ and $I_{1I}$ of the circuit of FIG. 5. Then, all the other settings described above with reference to the cycle with displacement of the table are made, since, during said sharpening cycle, the tool is sharpened with a succession of steps similar to those required for machining a workpiece with the tool in a cycle with displacement of the table. The relative displacements of the tool with respect to the sharpening device, and vice versa, are equal (apart from the length of the same displacements) to those of the workpiece relative to the tool of the preceding cycle.

In particular, on the setting devices $M_S$ and $M_F$ are set, respectively, the thickness of tool to be removed during the roughing-out operation and the overall thickness to be removed. On the setting devices $M_{IS}$, $M_{IF}$ the increments of displacement are set with which the cutterhead 3 (FIG. 1) must advance towards the sharpening device at the end of each or of two longitudinal displacements of the table; on the setting device $M_{II}$ the number of "idle cuts" is set, that is to say the strokes effected by the table relative to the tool 6 without any displacement of the cutterhead 3.

When the pushbutton $P_A$ is depressed (FIG. 5), then the circuit $C_{1H}$ (through the connection existing between the switch $I_{1I}$ and said circuit) and the circuit $C_{IB}$ are energized. Thus, a cycle will start which is quite similar to the cycle with displacement of the table already described, at the end of which the sharpening of the tool is obtained. When the sharpening operation is completed, the surface of the tool will be in the same position, relative to the workpiece, it had before starting said operation.

It will be apparent that many modifications and variation can be introduced in the embodiment of the invention described above, concerning both the shape and the arrangement of the various parts and components, without departing from the scope of the invention, as defined in the appended claims.

We claim:

1. Apparatus for automatic control of machine tools comprising:
  a stationary member,
  a movable member transversely movable toward and away from said stationary member,
  stepping motor means for supplying the motive power to said movable member,
  means for generating electrical pulses, the output of which is coupled to said stepping motor and
  frequency generator means for providing said pulses with predetermined frequencies, said frequency generator means having first and second oscillators generating different frequencies, said first oscillator causing said motor to move said movable member during a roughing-out operation, said second oscillator causing said stepping motor to move said member during a finishing operation with a speed slower than the speed of the roughing-out operation.

2. Apparatus for automatic control of machine tools comprising:
  a stationary member,
  a movable member transversely movable toward and away from said stationary member,
  moving means for moving said movable member in a rapid stroke,
  stepping motor means for providing the motive power to said movable member,
  means for generating electrical pulses, the output of which is coupled to said stepping motor,
  first and second oscillators for generating said pulses at different frequencies, said first oscillator causing said stepping motor to move said movable member in a roughing-out operation, said second oscillator causing said stepping motor to move said member in a finishing operation,
  first manually operable setting means for setting a first number of pulses corresponding to the thickness of the material to be removed from a workpiece during said roughing-out operation,
  second manually operable setting means for setting a second number of pulses corresponding to the thickness of material to be removed from the workpiece during said finishing operation,
  comparing means for comparing said first and second number of pulses with the pulses generated by said first and second oscillator and for generating a coincidence signal when said first number of pulses is reached and a second coincidence signal when said second number of pulses is reached,
  first means responsive to said first coincidence signal to disable the first oscillator and to activate the second oscillator and
  second means responsive to said second coincidence signal to disable the second oscillator.

3. Apparatus as defined in claim 2, further comprising:
  third oscillator means activated by said second coincidence signal for generating pulses at a frequency higher than the frequencies of said first and second oscillators and
  driving means connected to said third oscillator for driving the rotation of said motor in the direction opposite to that in which said motor is rotated in said finishing operation for bringing said movable member back to a resetting position.

4. Apparatus as defined in claim 3, further comprising:
  timing circuit means for activating said third oscillator with a predetermined delay for maintaining in contact a tool mounted on said movable member with the workpiece for high finishing of the surface of said workpiece.

5. Apparatus as claimed in claim 2 further comprising:
  timing circuit means for activating said first oscillator after a delay time shorter than, or equal to, the time required for said moving means to move said movable member to the position of the end of the forward stroke.

6. Apparatus as defined in claim 4 further comprising:
  servomechanism means which actuates a rapid return stroke of the movable member, said servomechanism being activated by said timing means.

7. Apparatus as defined in claim 4 wherein said workpiece has different radial sizes and further comprising:
  fourth oscillator means for supplying pulses to said stepping motor during a short approaching stroke of said movable member to said stationary member for bringing said tool in contact with said workpiece.

8. Apparatus as defined in claim 6 further comprising:

transducer means arranged for generating a contact signal when said tool comes into contact with said workpiece for disabling the fourth oscillator.

9. Apparatus as defined in claim 8 wherein said contact signal is also sent to said first oscillator in order to activate the same, thereby to start a working cycle.

10. Apparatus for automatic control of machine tools, comprising:

a stationary member mounting a workpiece having at least a pair of cylindrical portions to be machined, a movable member mounting a tool for machining said workpiece, said movable member being transversely and longitudinally movable with respect to said stationary member, stepping motor means for providing the motive power to said movable member and for moving transversely said movable member, moving means adapted to be activated for longitudinally moving said movable member, means for generating electrical pulses to be provided to said stepping motor, first and second oscillators for generating said pulses at different frequencies, said first oscillator causing said stepping motor to move said movable member in a roughing-out operation and said second oscillator causing said stepping motor to move said member in a finishing operation, a third oscillator for generating said pulses at a variable frequency, said third oscillator being adjustable for increasing and decreasing the frequency output thereof, first manually operable setting means for setting a first number of pulses corresponding to the thickness of the material to be removed from a workpiece during said roughing-out operation, second manually operable setting means for setting a second number of pulses corresponding to the thickness of the material to be removed from the workpiece during said finishing operation, third manually operable setting means for setting a third number of pulses corresponding to the difference between said cylindrical portions, comparing means for comparing said first and second number of pulses with the pulses generated by said first and second oscillator and for generating a first coincidence signal when said first number of pulses is reached, a second coincidence signal when said second number of pulses is reached and a third coincidence signal when said third number of pulses is reached, first means responsive to said first coincidence signal to disable said first oscillator and to activate said second oscillator and second means responsive to said second coincidence signal to disable said second oscillator, said second coincidence signal activating said moving means for operating same to bring said tool in correspondence with the second portion of said pair of portions and adjusting said oscillator to increase the frequency of the pulses, said third coincidence signal causing said third oscillator to be disabled and said first oscillator to be activated as to start a working cycle on the second cylindrical portion of said pair.

11. Apparatus as defined in claim 10, wherein said comparing means is so arranged as to generate a fourth coincidence signal when the pulses generated by said third oscillator differ from said third number by a predetermined amount, said fourth coincidence signal conditioning said third generator to decrease the frequency of the pulses.

* * * * *